(12) United States Patent
Kang et al.

(10) Patent No.: US 7,760,220 B2
(45) Date of Patent: Jul. 20, 2010

(54) DRAWING CONTROL METHOD FOR PRODUCING LABEL PATTERN

(75) Inventors: Yu-Ming Kang, Hsinchu (TW); Chi-Yuan Liu, Hsinchu (TW)

(73) Assignee: Lite-On IT Corp. (TW)

( * ) Notice: Subject to any disclaimer, the term of this patent is extended or adjusted under 35 U.S.C. 154(b) by 400 days.

(21) Appl. No.: 11/461,276

(22) Filed: Jul. 31, 2006

(65) Prior Publication Data
US 2007/0085897 A1 Apr. 19, 2007

(30) Foreign Application Priority Data
Oct. 18, 2005 (TW) .............................. 94136396 A

(51) Int. Cl.
*B41J 2/435* (2006.01)
(52) U.S. Cl. ...................................... 347/224
(58) Field of Classification Search ................. 347/224, 347/225; 369/43, 44.11, 44.14, 44.39, 275.1
See application file for complete search history.

(56) References Cited

U.S. PATENT DOCUMENTS

2002/0191517 A1* 12/2002 Honda et al. .............. 369/53.29
2006/0256184 A1* 11/2006 Hanks ........................ 347/234
2007/0019064 A1* 1/2007 Yamada et al. .............. 347/224

* cited by examiner

*Primary Examiner*—Matthew Luu
*Assistant Examiner*—Kendrick X Liu
(74) *Attorney, Agent, or Firm*—Raymond Sun

(57) ABSTRACT

A drawing control method is used for producing a label pattern on a label side of an optical disc. The optical disc is first loaded into an optical disc drive with the label side facing to an optical pickup head of the optical disc drive. The optical pickup head is controlled to move along a seeking direction from a first track to a second track in a long seeking operation; and then controlled to move along another seeking direction opposite to the seeking direction from the second track to a preset track range between lower track and an upper track. The optical pickup head then draws a label pattern on the label side of the optical disc in the preset track range.

6 Claims, 5 Drawing Sheets

DRAWING CONTROL METHOD FOR PRODUCING LABEL PATTERN

FIELD OF THE INVENTION

The present invention relates to a drawing control method for producing a label pattern, and more particularly to a drawing control method used in an optical disc drive for producing a label pattern on an optical disc.

BACKGROUND OF THE INVENTION

Optical discs such as compact discs (CDs), video compact discs (VCDs) and digital versatile discs (DVDs) are generally used to record date onto a data side thereof with a burner. For convenience, after the burning operation of a disc is finished, the title or other information should be marked on the label side of the disc. An approach for marking the disc utilizes a marking pen to write the information on the disc. If a wrong marking pen is selected, the disc is likely damaged because a very thin protective coating on the label side of the disc is vulnerable to chemical or physical attack. In accordance with another approach, an adhesive label is attached onto the label side of a disc. Although the attachment of the adhesive label makes the disc look more professional, there are still some drawbacks. For example, any air bubbles in the adhesive label may cause trouble. If the adhesive label is not perfectly aligned, vibration is likely rendered when the optical disc is rotating in the disc reading apparatus. For reading an unbalanced disc, the rotating speed has to be lowered in order to avoid errors.

Another method for drawing the label pattern onto the label side, which is also referred as a light-scribe technology, requires special discs with printable surfaces. The label sides of the discs are coated with a light-sensitive dye that becomes darkened when exposed to the laser light in a specially designed disc burner. After a blank disc is burnt in the usual way, the disc is flipped over and loaded to the burner again. By creating the desired label design on the computer system using a graphics program, the laser light burns the label pattern onto the label side. In comparison with the conventional disc marking method, the light-scribe technology is able to create high-quality label pattern on the disc, for example the effect of serigraphy or grey level.

Referring to FIG. 1, a conventional control system of an optical disc drive 100 is shown. An optical disc 110 is driven to rotate by a spindle motor 120. For reading data from the rotating disc, the optical pickup head (PUH) 10 is driven to move in the tracking direction by a sled motor 130 to perform a seeking operation. Further, the lens 1 of the optical pickup head 10 is driven to move in the tracking direction by a tracking coil 140 to perform a tracking operation or short seeking operation. The term "tracking operation" used herein means that the position of the lens 1 with respect to a selected track is maintained in the proper center position above the selected track. The term "seeking operation" or "short seeking operation" means that the lens 1 jumps from one track to another track. In addition, the lens 1 is driven to move in the focusing direction by a focusing coil 145 to perform a focusing operation.

When an electronic signal is generated responsive to an optical signal reflected from the optical disc 110 and received by the optical pickup head 10, the electronic signal is transmitted to a radio frequency (RF) amplifier 150 to be processed into a radio frequency signal RF, a tracking error signal TE and a focusing error signal FE. These signals RF, TE and FE are further processed by a digital signal processor (DSP) 170 to generate three control signals. In response to these three control signals, a first motor driver 160 makes adjustments to output driving forces for driving the sled motor 130, the tracking coil 140 and the focusing coil 145, thereby properly locating the optical pickup head 10 onto the desired track and desired focusing position. Under the control of the digital signal processor 170, a second motor driver 165 output a driving force for driving the spindle motor 120, thereby permitting rotation of the disc 110 at a revolving speed.

Unlike the data side of the disc, the label side for drawing the label pattern thereon according to the light-scribe technology has no tracks for the optical pickup head 10 to perform the tracking operation. Therefore, the optical pickup head 10 and lens 1 should be driven to move by the sled motor 130 and the tracking coil 140 in an open-loop control manner. Referring to FIG. 2, the label pattern printed by the optical disc drive supporting the light-scribe technology is illustrated. The tracks are determined by angular rotation of the sled motor 130. Due to the deviation resulted from the backlash of the driven gear, a pattern gap 20 between a first portion 21 and a second portion 22 is generated. Generally, the optical pickup head 10 is driven to move by the driven gear of the sled motor 130 from the inner track to the outer track in order to draw label pattern. For example, if the optical disc drive is preset to draw the label pattern from the 100th track to the 110th track and from the 200th track to the 210th track, the optical pickup head 10 is driven by the driven gear of the sled motor 130 to firstly draw label pattern on the region from the 100th track to the 110th track, then shift outwardly from the 200th track to the 210th track, and finally draw label pattern on the region from the 200th track to the 210th track. In a case that a command is issued to draw label pattern from the 111th track to the 120th track at that moment, the optical pickup head 10 will be driven by the driven gear of the sled motor 130 to firstly shift inwardly from the 210th track to the 111th track, and then draw label pattern on the region outwardly from the 111th track to the 120th track. Since the optical pickup head 10 is driven by the driven gear of the sled motor 130 to move inwardly to a selected track, the visible pattern gap 20 between the 111th track and the 110th track is generated due to the deviation resulted from the backlash of the driven gear.

SUMMARY OF THE INVENTION

The present invention provides a drawing control method used in an optical disc drive for producing a label pattern on an optical disc so as to eliminate deviation resulted from the backlash of the driven gear and remove the pattern gap.

In accordance with an aspect of the present invention, there is provided a drawing control method used in an optical disc drive for producing a label pattern on an optical disc by an optical pickup head, the optical disc having a data side and a label side, the drawing control method comprising steps of: loading the optical disc in the optical disc drive with the label side thereof facing to the optical pickup head; controlling the optical pickup head to move along a first seeking direction to draw the label pattern on the label side of the optical disc in a first preset track range between a first lower track and a first upper track, wherein said first seeking direction is the direction moving from the first lower track toward the first upper track; and controlling the optical pickup head to move along a second seeking direction from a first track to a second track, and then to move along the first seeking direction to draw the label pattern on the label side of the optical disc in a second preset track range between a second lower track and a second upper track, wherein the second track is outside and adjacent to the second preset track range and said second seeking direction is the direction moving from the first upper track toward the first lower track.

In accordance with another aspect of the present invention, there is provided a drawing control method used in an optical disc drive for producing a label pattern on an optical disc by an optical pickup head, the optical disc having a data side and a label side, the drawing control method comprising steps of: loading the optical disc in the optical disc drive with the label side thereof facing to the optical pickup head; controlling the optical pickup head to move along a first seeking direction from a first track to a second track in a long seeking operation; and controlling the optical pickup head to move along the first seeking direction from the second track to a first preset track range between a first lower track and a first upper track, and then to draw a label pattern on the label side of the optical disc in the first preset track range, wherein said first seeking direction is the direction moving from the first lower track toward the first upper track.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
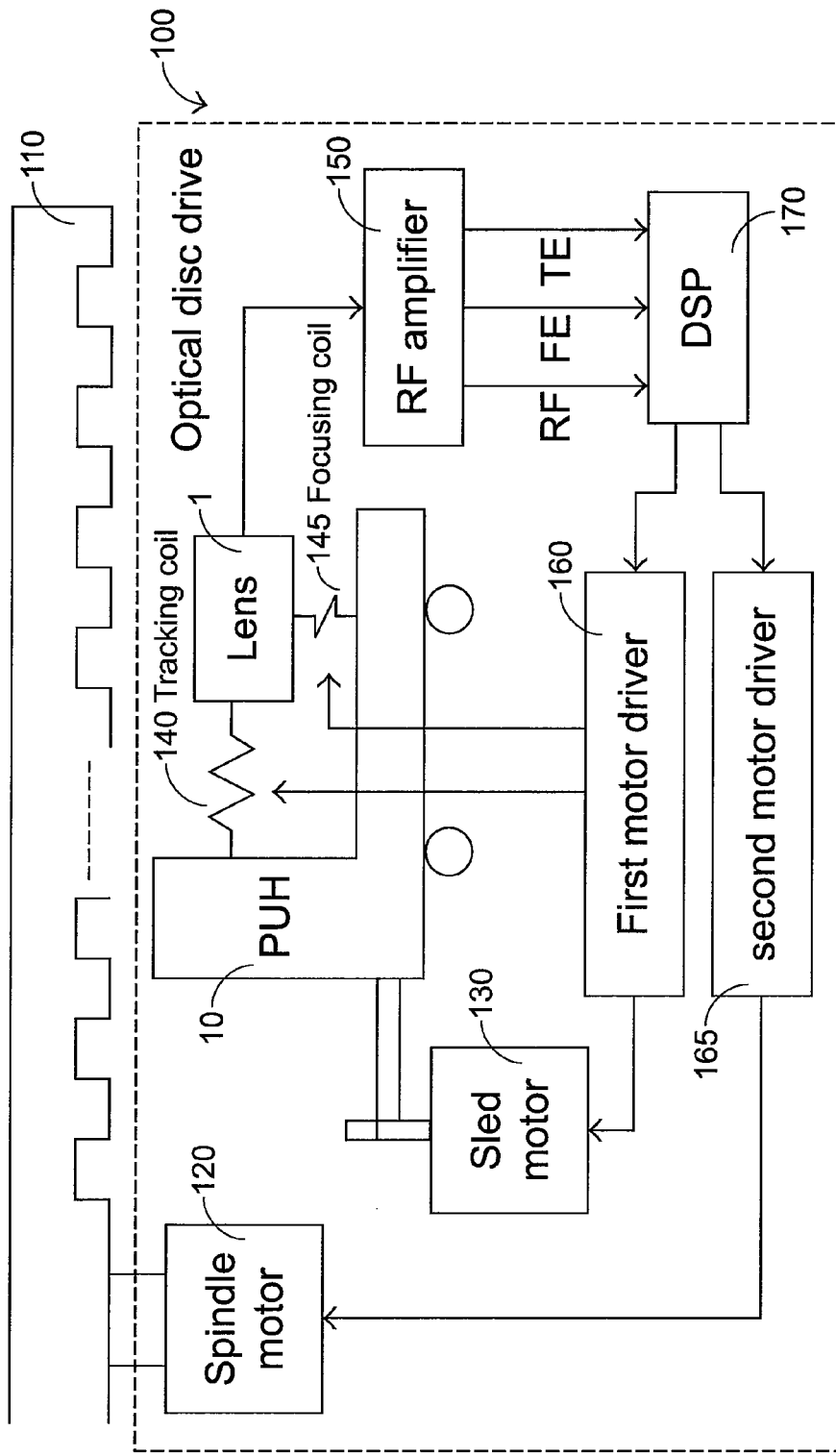
FIG. 1 is a functional block diagram illustrating a conventional focusing control system.
Figure 2:
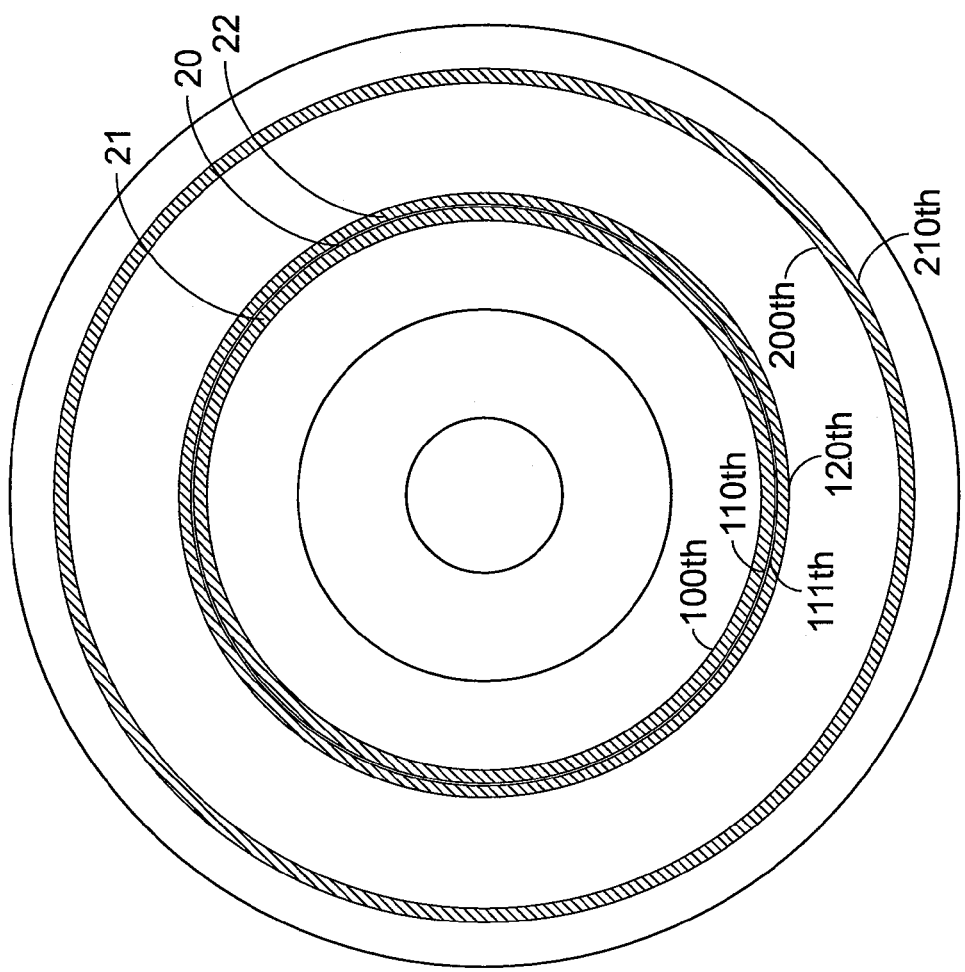
FIG. 2 is a schematic view illustrating the label pattern drew by an optical disc drive, which supports the light-scribe technology.

Hereinafter, an embodiment of a drawing control method for producing label pattern on an optical disc according to the present invention will be illustrated with reference to the control system of FIG. 1 and the flowchart of FIG. 3.

Figure 3:
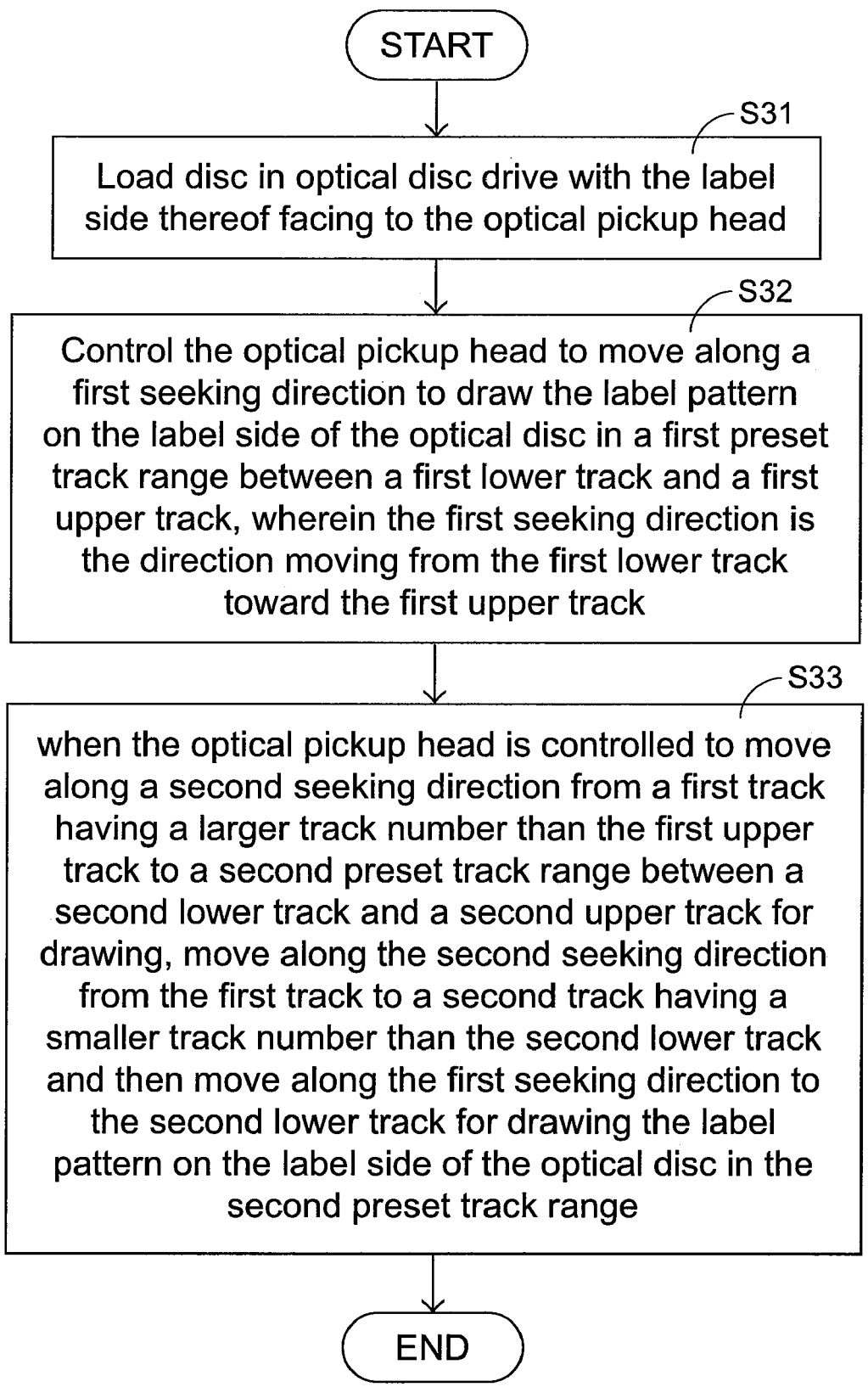
FIG. 3 is a flowchart illustrating a drawing control method for producing a label pattern on an optical disc.

Please refer to FIG. 3. Firstly, an optical disc is loaded in the optical disc drive with the label side thereof facing to the optical pickup head (step S31). Then, the optical pickup head is controlled to move along a first seeking direction to draw the label pattern on the label side of the optical disc in a first preset track range between a first lower track and a first upper track (step S32). The first seeking direction is the direction moving from the first lower track toward the first upper track. Afterward, when the optical pickup head is controlled to move along a second seeking direction from a first track having a larger track number than the first upper track to a second preset track range between a second lower track and a second upper track for drawing, move along the second seeking direction from the first track to a second track having a smaller track number than the second lower track and then move along the first seeking direction to the second lower track for drawing the label pattern on the label side of the optical disc in the second preset track range (step S33). The second track is outside and adjacent to the second preset track range. The second seeking direction is the direction moving from the first upper track toward the first lower track.

Figure 4:
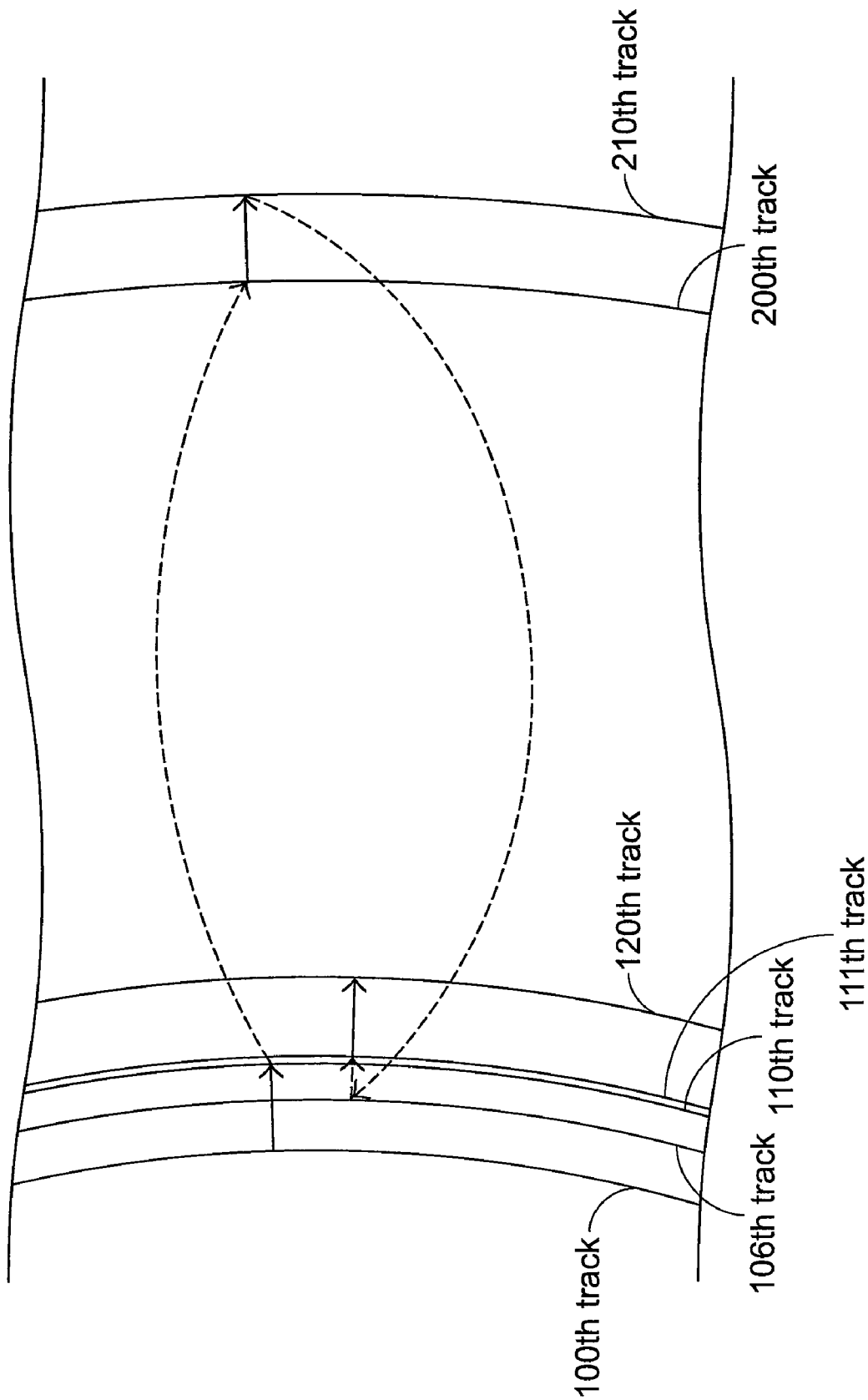
FIG. 4 schematically illustrates movement of the optical pickup head according to a method of the present invention.

Please refer to FIG. 4, which illustrates movement of the optical pickup head according to a method of the present invention. In this embodiment, the track number of the inner track is smaller than that of the outer track. Further, the first upper track and the first lower track of the first preset track range are the 110th track and the 100th track, respectively. The second upper track and the second lower track of the second preset track range are the 120th track and the 111th track, respectively. The first track is the 210th track. The second track is less than the first upper track by n tracks, where n is an integer less than 10. For example, the second track is the 106th track. If the optical disc drive is preset to draw the label pattern from the 100th track to the 110th track and from the 200th track to the 210th track, the optical pickup head 10 is driven by the driven gear of the sled motor 130 to firstly draw label pattern on the region from the 100th track to the 110th track along the first seeking direction, shift outwardly to the 200th track, and then draw label pattern on the region from the 200th track to the 210th track. Afterward, if another drawing command is issued to draw label pattern in the second preset track range of from the 111th track to the 210th track, the optical pickup head 10 is driven by the driven gear of the sled motor 130 to inwardly move from the 210th track to the 106th track along the second seeking direction, shift outwardly to the 111th track, and then draw label pattern on the region from the 111th track to the 210th track. In this way, the deviation resulted from the backlash of the driven gear will be eliminated and thus the pattern gap is absent.

From the above description, the method of the present invention can be extended to control the sled motor 130 such that the optical pickup head 10 is driven to move in a one-way direction to perform a long seeking operation. Generally, the term "long seeking operation" means that the optical pickup head jumps for more than 40 tracks. For performing the long seeking operation, the optical pickup head needs to be quickly moved to the target track. Firstly, an optical disc is loaded in the optical disc drive with the label side thereof facing to the optical pickup head. Then, the optical pickup head is controlled to move along a first seeking direction to draw the label pattern on the label side of the optical disc in a first preset track range between a first lower track and a first upper track. The first seeking direction is the direction moving from the first lower track toward the first upper track. For drawing the label pattern on the label side of the optical disc in a second preset track range between a second lower track and a second upper track, in which the difference between the first upper track and the second lower track is very large, the optical pickup head should be firstly controlled to move along the first seeking direction to a first track, which is outside and adjacent to the second preset track range. Then, the optical pickup head is moved along the first seeking direction to draw the label pattern on the label side of the optical disc in the second preset track range. The first track is less than the second lower track by n tracks, where n is an integer less than 10.

Figure 5:
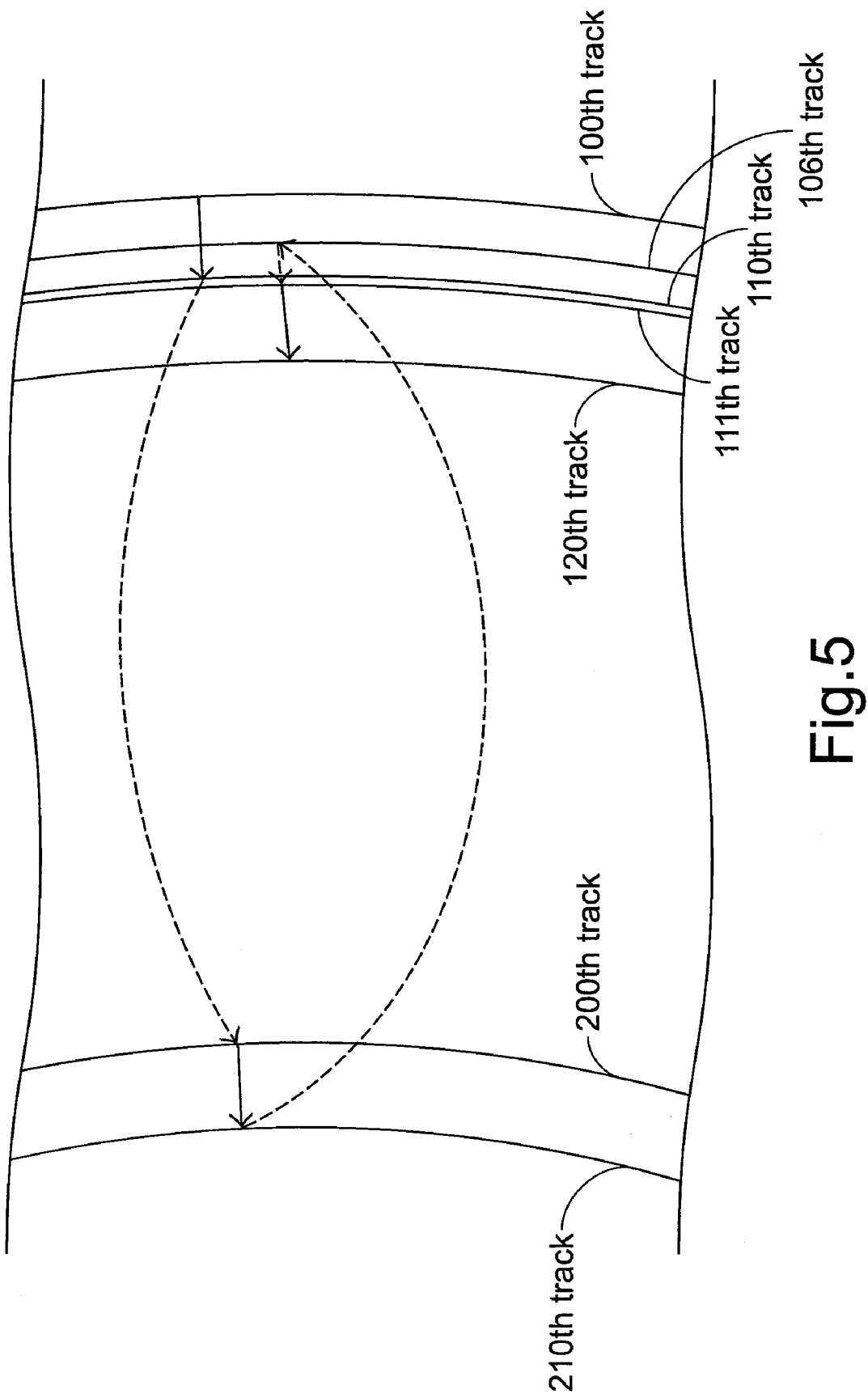
FIG. 5 schematically illustrates movement of the optical pickup head according to another method of the present invention.

A further embodiment of a drawing control method is illustrated in FIG. 5. In this embodiment, the track number of the inner track is larger than that of the outer track. Please refer to FIG. 5, which illustrates movement of the optical pickup head according to another method of the present invention. In this embodiment, the first upper track and the first lower track of the first preset track range are the 110th track and the 100th track, respectively. The second upper track and the second lower track of the second preset track range are the 210th track and the 111th track, respectively. The first track is the 210th track. The second track is less than the first upper track by n tracks, where n is an integer less than 10. For example, the second track is the 106th track. If the optical disc drive is preset to draw the label pattern from the 100th track to the 110th track and from the 200th track to the 210th track, the optical pickup head 10 is driven by the driven gear of the sled motor 130 to firstly draw label pattern on the region from the 100th track to the 110th track along the first seeking direction, shift inwardly to the 200th track, and then draw label pattern on the region from the 200th track to the 210th track. Afterward, if another drawing command is issued to draw label pattern in the second preset track range of from the 111th track to the 210th track, the optical pickup head 10 is driven by the driven gear of the sled motor 130 to outwardly move from the 210th track to the 106th track along the second seeking direction, shift inwardly to the 111th track, and then draw label pattern on the region from the 111th track to the 210th track. In this way, the deviation resulted from the backlash of the driven gear will be eliminated and thus the pattern gap is absent.

In the above embodiments, the label side of the disc is coated with a light-sensitive dye printable by the laser light. The optical disc drive of the present invention is a CD drive, a VCD drive, a DVD drive or other optical disc drive having a specially designed disc burner supporting the light-scribe technology.

From the above description, the object of the present invention is achieved by rewriting the firmware of the optical disc drive without changing the driven gear and driving motor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A drawing control method used in an optical disc drive for producing a label pattern on an optical disc by an optical pickup head, the optical disc having a data side and a label side, the drawing control method comprising steps of:
    loading the optical disc in the optical disc drive with the label side therefore facing to the optical pickup head;
    driving the optical pickup head by a sled motor to move along a first direction from a first range of tracks to a second range of tracks in a long seeking operation;
    driving the optical pickup head by the sled motor to move along a second direction opposite to the first direction from the second range of tracks to a preset track;
    advancing the optical pickup head to move along the first direction to a third range of tracks, and drawing a label pattern on the label side of the optical disk in the third range of tracks,
    wherein the third range of tracks is located between the first range of tracks and the second range of tracks and is immediately adjacent the first range of tracks, and the preset track is outside the third range of tracks and is at the side where the first range of tracks are located.

2. The drawing control method according to claim 1 wherein the preset track is inside the first range of tracks.

3. The drawing control method according to claim 1 wherein the first direction is from the inner portion to the outer portion of the optical disc.

4. The drawing control method according to claim 1 wherein the first direction is from the outer portion to the inner portion of the optical disc.

5. The drawing control method according to claim 1, further including the step of:
    drawing a label pattern in the first range of tracks.

6. The drawing control method according to claim 5, further including the step of:
    drawing a label pattern in the second range of tracks.

* * * * *